Figure 8:
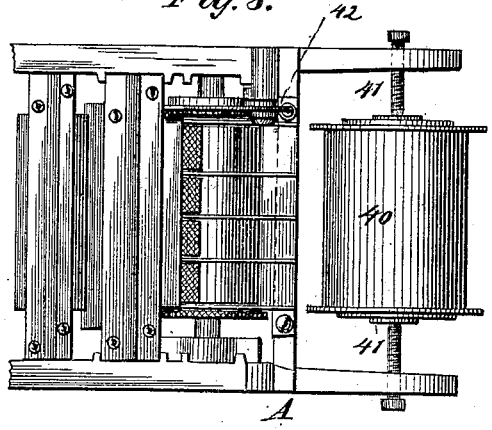

(No Model.)  
8 Sheets—Sheet 1.
J. C. RICHARDSON.
CAN LABELING MACHINE
No. 266,315.  
Patented Oct. 24, 1882.
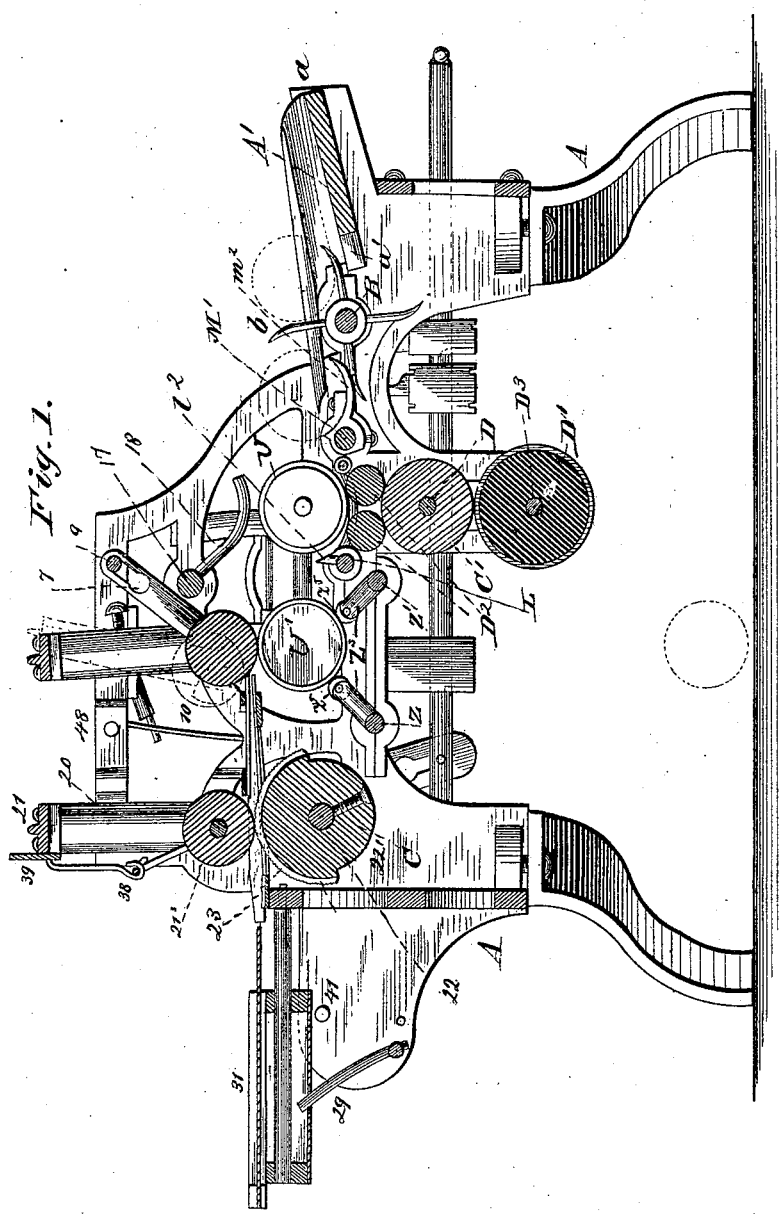
WITNESSES  
Fred. G. Dieterich  
F. C. Dieterich
INVENTOR  
James C. Richardson  
by T. S. Smith  
Attorneys
N. PETERS, Photo-Lithographer, Washington, D. C.

(No Model.) 8 Sheets—Sheet 2.
J. C. RICHARDSON.
CAN LABELING MACHINE.
No. 266,315. Patented Oct. 24, 1882.
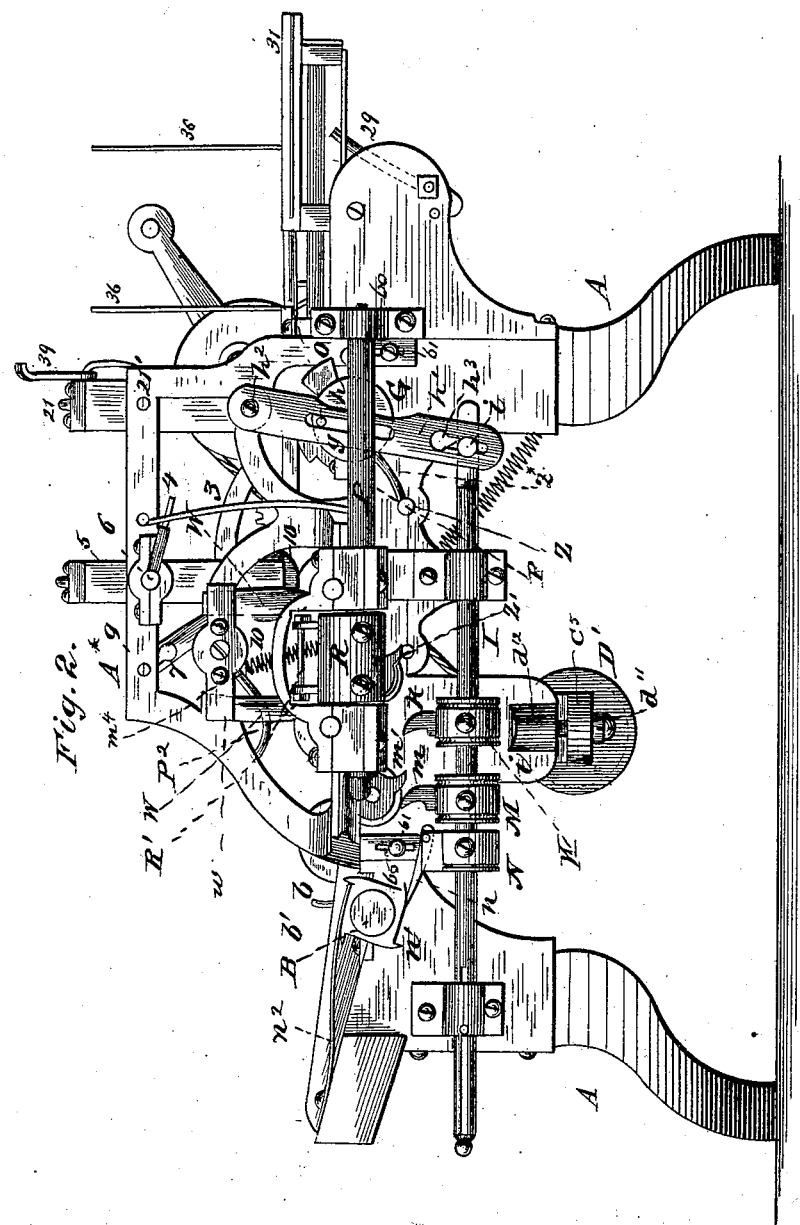
WITNESSES
INVENTOR
James C. Richardson
by T. S. Smith
Attorneys (No Model.) 8 Sheets—Sheet 3.
J. C. RICHARDSON.
CAN LABELING MACHINE.
No. 266,315. Patented Oct. 24, 1882.
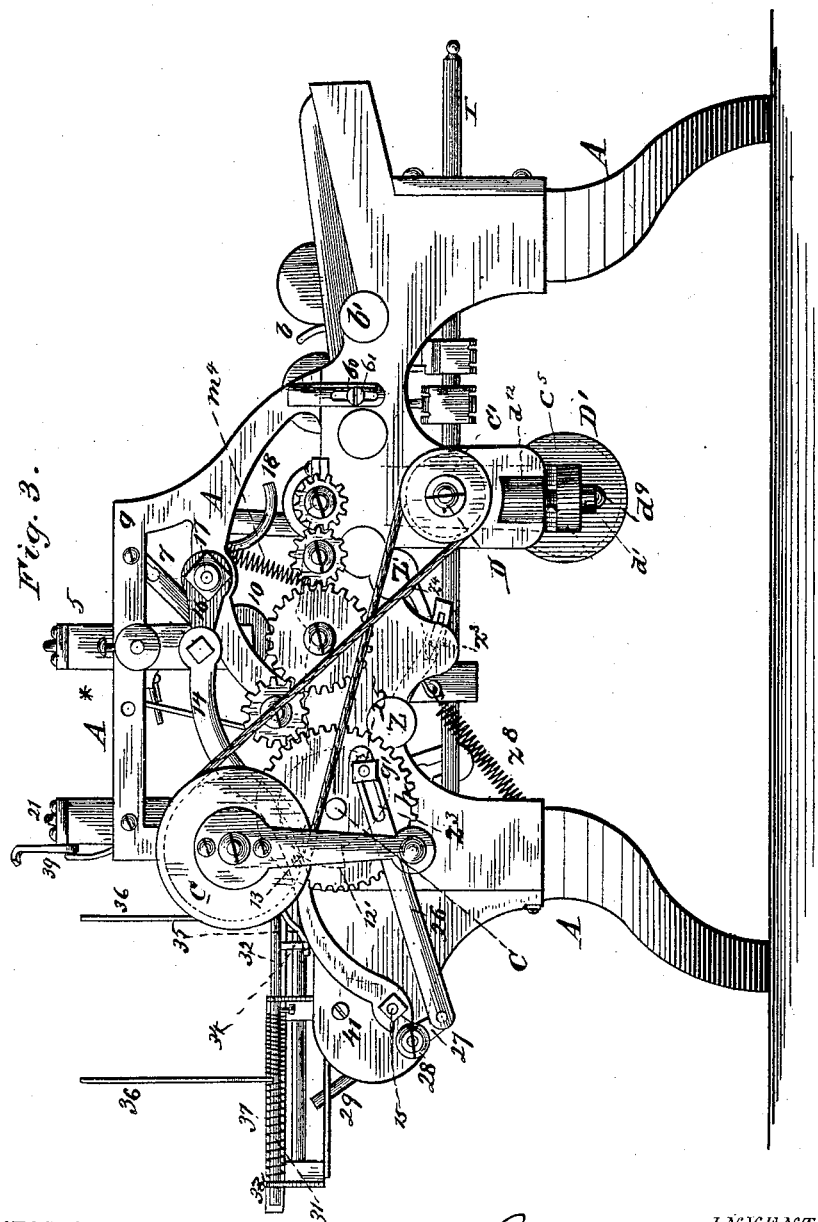
WITNESSES
Fred. G. Dieterich
P. C. Dieterich
INVENTOR
James C. Richardson
by T. S. Smith
Attorneys
N. PETERS. Photo-Lithographer, Washington, D. C.

(No Model.)   8 Sheets—Sheet 4.
J. C. RICHARDSON.
CAN LABELING MACHINE.
No. 266,315.   Patented Oct. 24, 1882.
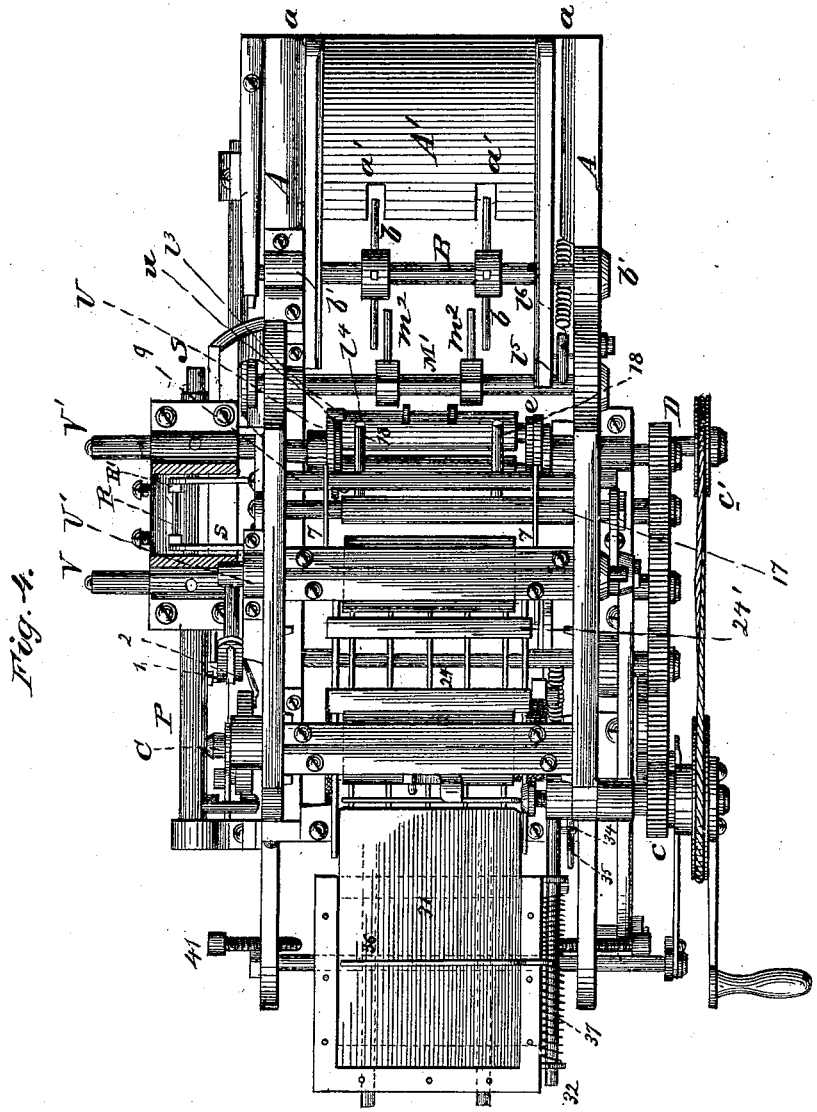
WITNESSES
INVENTOR
James C. Richardson
by T. S. Smith
Attorneys

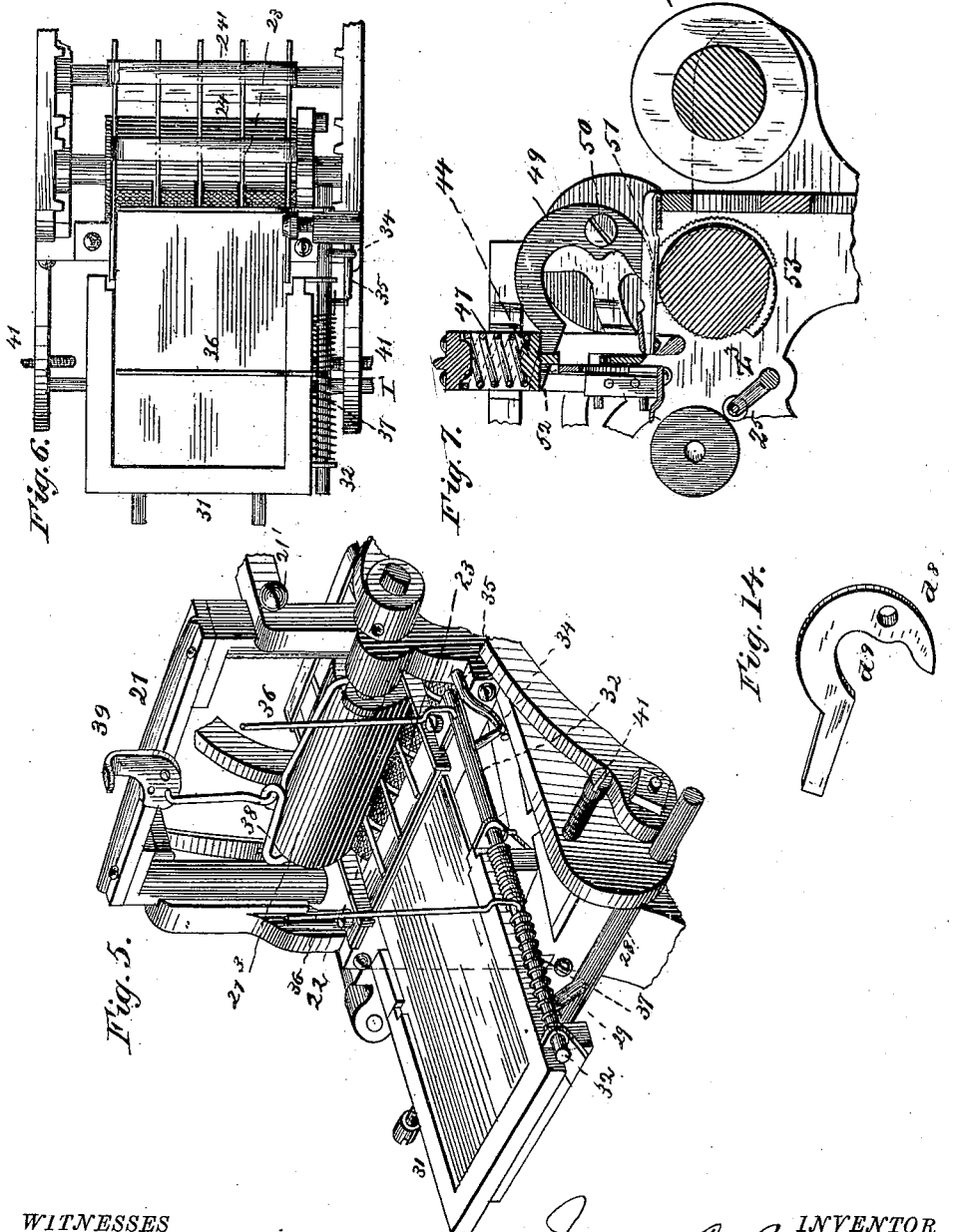

(No Model.)

J. C. RICHARDSON.
CAN LABELING MACHINE.

No. 266,315. Patented Oct. 24, 1882.

WITNESSES
Fred. G. Dieterich.
P. C. Dieterich.

INVENTOR
James C. Richardson
by T. S. Smith
Attorneys (No Model.) 8 Sheets—Sheet 7.
J. C. RICHARDSON.
CAN LABELING MACHINE.
No. 266,315. Patented Oct. 24, 1882.
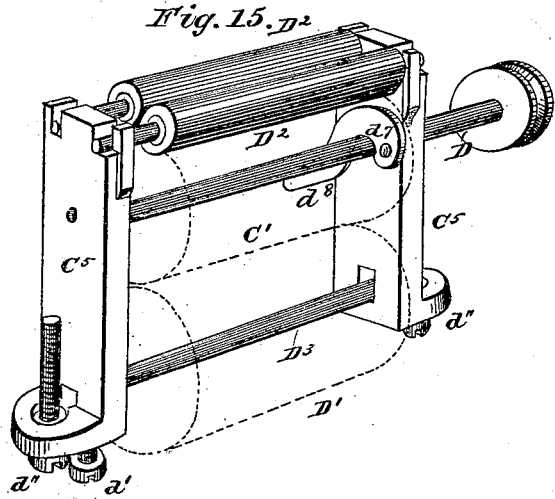
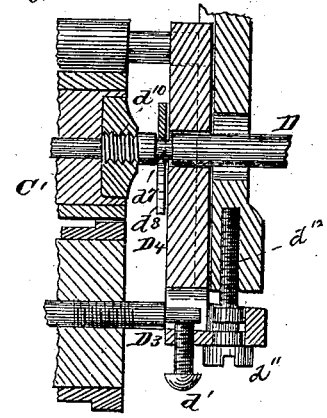
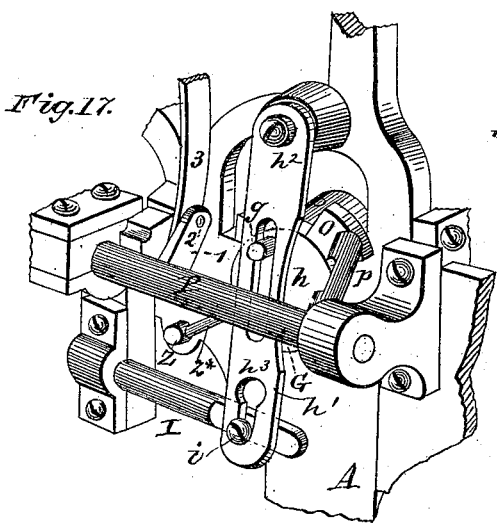
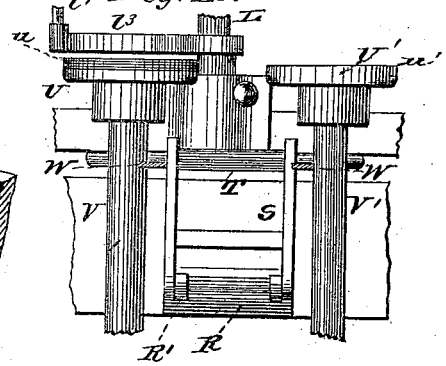
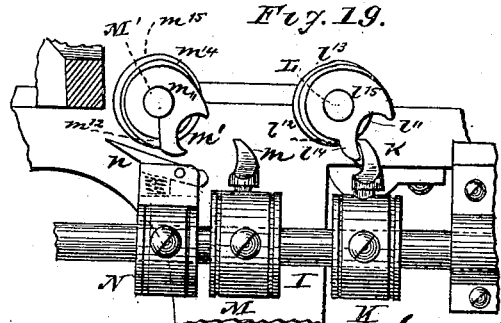
WITNESSES
Fred. G. Dieterich
P. C. Dieterich
INVENTOR
James C. Richardson
by F. L. Smith
Attorneys

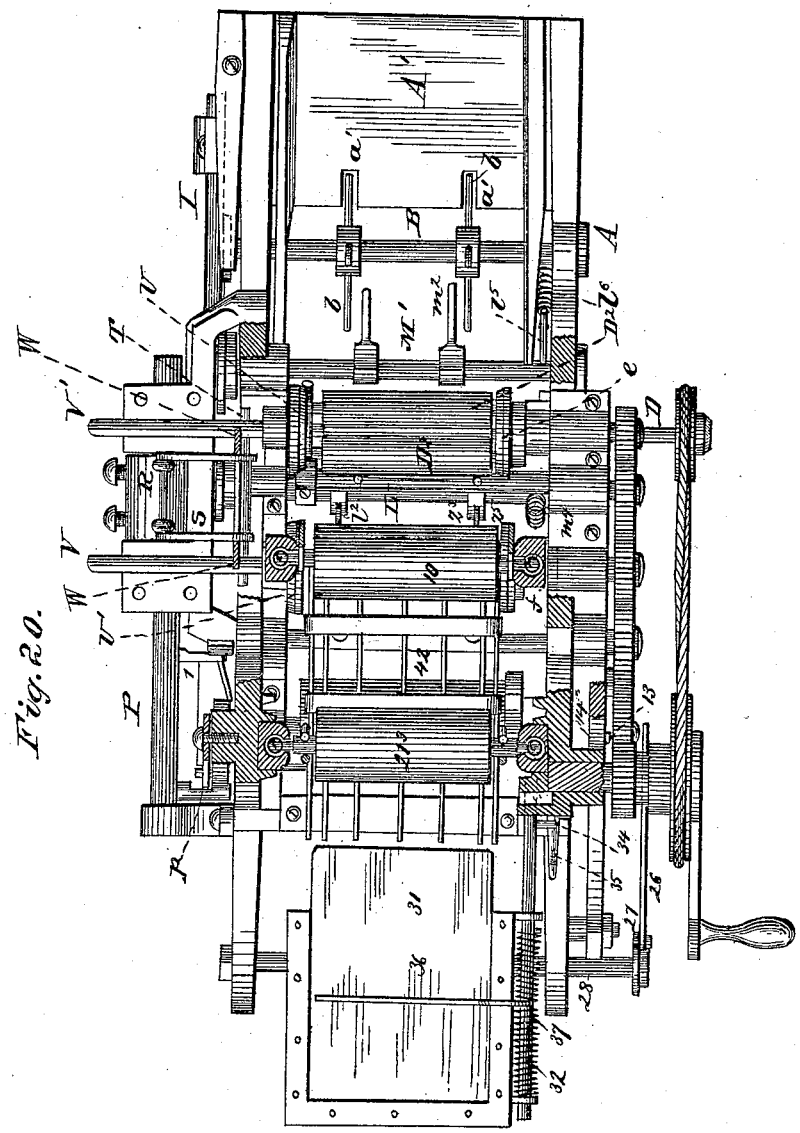

UNITED STATES PATENT OFFICE.

JAMES C. RICHARDSON, OF BOSCOBEL, WISCONSIN.

CAN-LABELING MACHINE.

SPECIFICATION forming part of Letters Patent No. 266,315, dated October 24, 1882.

Application filed November 7, 1881. (No model.)

*To all whom it may concern:*

Be it known that I, JAMES C. RICHARDSON, a citizen of the United States, residing at Boscobel, in the county of Grant and State of Wisconsin, have invented certain new and useful Improvements in Can-Labeling Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a machine for labeling the receptacles containing canned goods, such as fruits, vegetables, meats, or the like; and the novelty consists in the construction, arrangement, and adaptation of parts, as will be more fully hereinafter set forth, and specifically pointed out in the claims.

The object of the invention is to gum and label the receptacle containing such canned goods or other articles, whether square, round, rectangular, or other form, automatically; and to this end the invention consists essentially in a can-feeding device, a label-feeding reciprocating table, a series of gumming-rollers, a label-feeding roller serrated, corrugated, or roughened, a clamping device adapted to embrace the can or other article to be labeled, and expelling means by which the can or the like as soon as labeled may be expelled, as will be shown and explained. The can or other article is preferably fed to the machine from one end and the label from the other, the article being clamped between revolving heads entering the ends of the can and adjacent to the gum-feeding rolls until the article has been gummed and the label applied to the article, when the said article is expelled, the entire operations being performed automatically by the several devices from a common main shaft.

For convenience the invention will be described in detail, each train of devices which subserves a purpose being mentioned in detail, and the operation, as described, setting forth the relative connection.

The labels may be fed separately by the operator, or from a reel upon which strips of many labels are printed; and in the latter case I provide a removable cutting-knife, which operates with a removable table, as shown. This cutting-knife, when applied, is also operated automatically, and is an interchangeable device.

The device is designed to accommodate different lengths of cans by making the clamping device adjustable, and the frame is made adjustable to accommodate different diameters.

The invention is fully illustrated in the accompanying drawings, which form a part of this specification, and in which—

Figure 9:
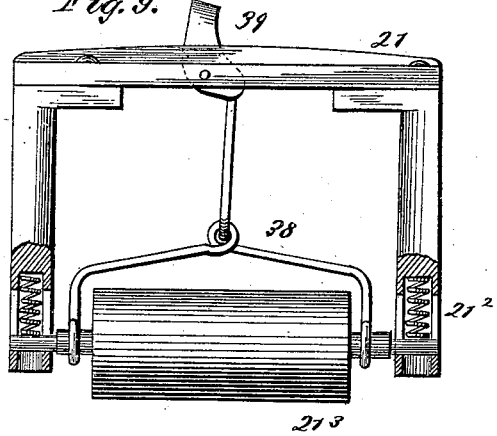
Figure 10:
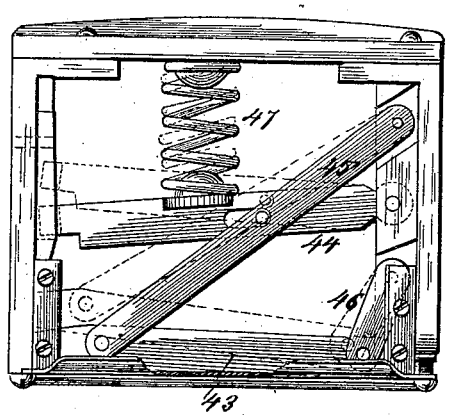
Figure 11:
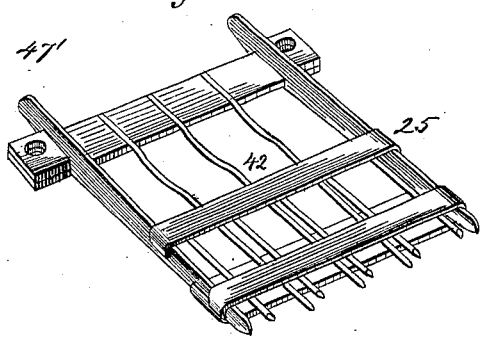
Figures 12, 13:
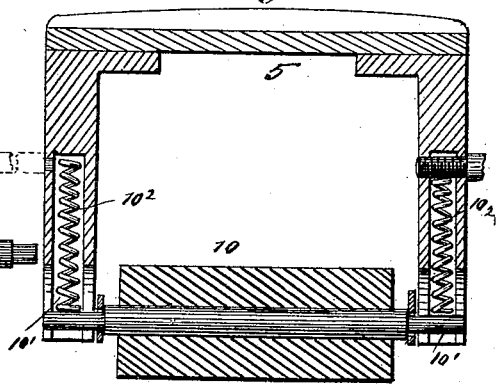

Figure 1 is a central longitudinal section; Figs. 2 and 3, side elevations, shown in opposite directions. Fig. 4 is a top plan view, partly in section. Fig. 5 is a detail perspective view of the free end of the machine; and Figs. 6 and 7, details, as also are Figs. 8, 9, 10, 11, 12, 13, and 14. Fig. 15 is a perspective view of the gumming-rolls and their bearings; Fig. 16, a section of the same; Fig. 17, a perspective detail; Fig. 18, a plan view of a portion with the cap removed, and Fig. 19 a side detail of tinning devices. Fig. 20 is a horizontal section, looking downward, taken on the line of the label-feeding and label-applying roll.

Referring to the drawings, in which similar letters of reference indicate like parts in all the figures, A represents a base-frame, of cast metal, having proper legs or supports, and A* an upper frame, having slotted arms 60, said upper frame being adjustably secured to the base-frame by set-screws 61, by which means the machine may be adjusted so as to accommodate cans of different sizes. The base-frame A is provided with guides $a$, which receive an inclined feeding-table, A', having recesses $a'$, through which operate the radial arms $b$ of a shaft, B, journaled in the frame at $b'$, and adapted to feed the cans forward, one at a time, in such a manner that as one can is released by one of the arms $b$ the succeeding arm will hold the other cans back, the shaft B being "timed" so as to work automatically with the other operating parts of the machine, which will be described.

C represents the main shaft, geared to the power-shaft at $c$, and connected to shaft D by a belt, $c'$, upon which shaft D is hung a flexible roller, C'. This roller C' contacts with a roller, D', which is partially immersed in an adhesive material, (not shown,) the shaft $D^3$ of which is journaled adjustably in a frame, $C^5$, which in turn is adjustable in the main frame A by set-screw $d''$ in such a manner that a frictional contact between the rollers will always be maintained. The roller $C'$ also has frictional contact with duplicate gum-applying rolls $D^2$, upon which the can bears while the gum is being applied. Through a train of gearing connected with the main shaft C is revolved an abutting head, $e$, between which and a corresponding clamping-head, U, having loose or pivoted bearing surface $u$, the can or the like is held while the gum is being applied, and a similar abutting head, $f$, revolved by the same train of gearing, serves, in connection with a clamping-head, $U'$, having a pivoted bearing-surface, $u'$, to revolve the can in connection with the label-applying roll. An eccentric-pin, $g$, upon a disk, G, upon the opposite end of the main shaft C, operates in a slot, $h$, in a pivoted lever, $h'$, to reciprocate a horizontal bar, I, to which the lever $h'$ is loosely secured by means of pin $i$ and slot $h^3$, the lever $h'$ being pivoted to the frame of the machine at $h^2$. The reciprocating bar I is provided with adjustable blocks, by means of which several of the devices are so timed as to render their operation automatic—that is to say, upon the said bar I is adjustably secured a block, K, having a projecting lug, $k$, which contacts with each thrust of the bar I in one direction, with a lug, $l^{14}$, upon a pawl, $l^{15}$, loosely hung upon the recessed-head $l^{11}$ of the shaft L, said head $l^{11}$ having a shoulder, $l^{12}$, against which the lug $l^{15}$ abuts to oscillate the shaft L. Upon the return movement of the bar I the rigid pawl $k$ compresses the spring $l^{13}$ and allows the block K to pass idly. The shaft L is provided with arms $l^2$, which prevent the can from leaving the gumming-rolls until the gum has been properly applied, and also with a curved radial arm, $l^3$, having a transverse portion, $l^4$, which serves automatically to throw the gummed can from the gumming to the labeling rolls as soon as released from the clamps $e$ U. The shaft L is restored to a normal position by means of a spring, $m^4$, as soon as the lug $k$ has passed the pawl $l^{15}$. In like manner M represents a similar block similarly adjusted upon the bar I, having lug $m$, which, at the proper time of the thrust of the bar I, engages a lug, $m'$, upon a pawl, $m^{11}$, held against a shoulder, $m^{12}$, upon a head, $m^{14}$, of a rock-shaft, $M'$, by a spring, $m^{15}$. The rock-shaft $M'$ has curved radiating arms $m^2$, which serve to throw the can from the feeder B $b$ to the gumming-rollers $D^2$ and clamps U $e$. An arm, $l^5$, and spring $l^6$, secured to both arm and frame A, serve to restore the shaft $M'$ to a normal position as soon as the lugs $m\ m'$ are out of contact, and the lug $m$ rides idly back by the compression of the spring $m^{15}$. N represents an adjustable block, having a spring-lug, $n$, which contacts with lugs $n'$ upon the feeder-shaft B, and serves to rotate said shaft intermittently to feed the cans forward one at a time, a spring, $n^2$, preventing the pressure of the cans from giving the shaft a return movement. The adjustability of these blocks K M N allows the proper timing of the shafts B $M'$ L for the purpose desired to insure automatic operation.

A lug, $o$, upon the periphery of the disk G, operates in connection with a pin, $p$, on a rock-shaft, P, to oscillate said rock-shaft, which carries an adjustable block, R, having radial arms $R'$, to the free ends of which are pivoted arms S, which loosely connect said arms to a cross-bar, T. This cross-bar T is connected to the transverse shanks V $V'$ of the clamping-heads U $U'$ and force these clamping-heads to operate simultaneously upon the cans against the abutting heads $e f$. The springs W W act with a constant force to hold the clamps in operation except when the lug $o$ bears against the pin $p$ to oscillate the shaft P and force the clamps outward to release the cans. The springs W W are secured to the adjustable frame $A^*$, and bear against the outer side of the cross-bar T. The revolving or loose portions $u\ w'$ of the clamps have flexible bearing-faces, as shown.

A pin or lug (not shown) located upon the inner surface of the disk G through an arm, $z^*$, oscillates a shaft, Z, having an arm, $z^3$, which is loosely connected to a similar arm, $z^4$, upon a shaft, $Z'$, in such a manner that the movement of the shaft Z will oscillate the shaft $Z'$. Each of these shafts has upwardly and inwardly inclined arms $Z^3$, the free extremities of which are provided with friction-rollers, which serve as a bearing for the can being revolved by the clamps $U'\ f$ and being labeled. As soon as the label has been applied the clamp releases the can, the shafts Z $Z'$ oscillate, the arms $Z^3$ assume a vertical position, and the can is expelled automatically, the arms resuming an operative position as soon as the labeled can has passed by reason of the force of the spring $z^6$ upon the arm $z^3$.

Rigid upon the rock-shaft P is an arm, 1, which is pivoted to a vertical bar, 3, at 2 and loosely connected to an arm, 4, rigid with a pivotal shaft, 6, of a frame, 5, journaled in the frame $A^*$. The frame 5 carries a journaled roller, 10, adapted, by means of its flexible surface, to hold the label with a constant force to the can while in the labeling-clamps $U'\ f$. The frame 5 shifts its position with each oscillation of the rock-shaft P, first to grip the label, and then to press it evenly upon the gummed can, is loosely attached to the cross-bar 9 by the slotted arms 7, and the roll 10, housed in recesses $10'$ in the legs of the frame 5, is retreated by the action of the arm 7 against the springs $10^2$ when the frame 5 is oscillated in one direction by the action of the rock-shaft P.

It is necessary that the can or the like should be held firmly to the gumming-rollers while held in the clamps U $e$, and to secure this end I provide upon the main shaft-gear a cam, $12'$, which operates in conjunction with a pin, 13, (shown in dotted lines in Fig. 3,) upon a lever, 14, pivoted at 15 to the main frame, which lever is loosely connected to an arm, 16, rigid upon a shaft, 17, having arms 18, which bear upon the can, as shown. The clamp-head U is receded or forced outward by the action of the rock-shaft P until the arm $l^3$ $l^4$ (see Figs. 4 to 18) expels the can from the gumming-rolls to the labeling-roll, after which the said arm recedes to allow the clamp U to catch the succeeding can.

In vertical guides 20 operates a frame, 21, adjustable by a set-screw, 21', and having spiral springs, $21^2$, which serve to hold a flexible roller, $21^3$, in contact with the feed-roll 22, which is provided with circumferential grooves 23, which accommodate the lower guide-rods, 24, of an open frame, 24', comprising the label-feeding guide. The feed-roll 22 has a segmental recess, 22', which is adapted to allow for the necessary delay in the feed of the label to the article. When said recess 22' is uppermost the label ceases to feed forward to the can, and the roller $21^3$ is supported idly upon the rods 24. When the roughened portion of the feed-roll again appears and projects between the rods 24 the label is fed forward.

Upon an eccentric-pin, 25, upon the main shaft-gear, is hung a lever-arm, 26, which is loosely connected to an arm, 27, rigid with a transverse rock-shaft, 28, from which radiates a rigid arm, 29, which is connected to and serves to reciprocate a table, 31, adapted to carry the label.

It being necessary to hold the label against slipping upon the table-top, I provide a longitudinal rock-shaft, 32, properly journaled at one side of the table, and provide it with a rigid arm, 34, which operates upon an incline, 35, in such a manner as to throw radial spring-arms 36 upon the table over the label with each forward movement of the table and hold it until the return of the table allows the arm 34 to ride down the incline, the arms 36 being forced up and back by the action of spiral spring 37, which may be a continuation of said arms 36, if desired.

Upon the center of the top cross-bar of the frame 21 is pivoted a cam-lever, 39, to which is loosely pivoted spring wire connections 38, which allow the springs $21^2$, housed in the frame 21, to be contracted at will as the roll above the feed-roll is elevated, and the cam-lever is enabled to hold them up in a locked position by passing the frame pivotal point beyond the cam-pivot.

I provide for feeding many printed labels upon a single paper strip to the feeding roll by furnishing a reel, 40, which I pivot upon adjustable points 41 in the frame. When the machine is thus used I remove the table 31 and open frame 24' and insert the open frame 42, which is similar to the open frame 24', except shorter, securing it in the frame by the same means and in the same manner as was the frame 24'.

To sever the labels automatically when using reel 40, and to have the severing device register perfectly and instantly with the other automatic portions of the machine, I provide a cutting-knife, 43, having a draw-cut, by three levers, 44, 45, and 46, and a spring, 47, the levers being located in a rectangular frame, 47', and connected thereto by pivots, the frame 47' being adapted to be inserted in vertical guideways 48 in the adjustable frame A*. The knife 43 is operated by a cam-lever, 49, pivoted to the frame A* at 50, having a rounded portion, 51, and an arm, 52, which reaches under and operates one end of the lever 44 to raise it, the knife 43 being instantly forced down upon the label by the spring 47. The portions 51 of the cam 49 is operated by the cam 53, located upon the feed-roll.

The shaft D is provided with an annular slot, $d^7$, near the roll C', which, in connection with a holding-arm, $d^8$, having a semicircular recess, $d^9$, (see Fig. 14,) serves to hold said shaft D against lateral play. The arm $d^8$ $d^9$ is pivoted to the adjustable frame $C^5$. The shaft D is provided with a screw-thread, $d^{10}$, and the roll C' with a corresponding female thread. Hence to remove the roll C' it is only necessary to unship the belt, throw the arm $d^8$ $d^9$ out of contact with the annular slot $d$, and, holding the roll, unscrew the shaft D by turning the pulley, and the roll is readily liberated.

$C^5$ represents a removable adjustable frame in which the several rolls C' D' $D^2$ are journaled, and it may be raised or lowered by means of set-screws $d^{11}$, which operate in connection with threaded apertures $d^{12}$ in the base-frame A, and the lower roll is vertically adjustable in said frame by set-screw $d'$.

It will be observed that the shaft B is journaled at the foot of the feeding-table, which is inclined, and consequently self-feeding. This shaft has a quadruplicate series of radial arms, $b'$, and as one series of arms approach toward the plane of the table the succeeding series automatically and gradually are forced up before the succeeding can, the declining series not losing its repelling force until the following series are in holding operation. By this construction the cans will only be fed one by one as the machine calls for them, no matter how many are on the feeding-table.

From the foregoing description, taken in connection with the drawings, the operation of the invention is obvious. The cans or other article to be labeled is placed upon the feeding-table, and from thence between two of the arms $b$ upon the shaft B, operated by the adjustable block N, are carried over to the carrying-arms $m^2$ of the shaft M', operated by the block M, thence to the gumming-rolls $D^2$, where each is clamped by the clamping-heads U and $f$, from thence to the labeling-chamber, where each is clamped by the head U' and $e$ and revolved until the roller 10 grips the label and holds it to the article. The heads U U' and $e$ and $f$ force the article to revolve, and after it has received the gum from the rolls $D^2$ and the label has been applied to the gummed surface the can or other article is expelled by its gravity through the action of the shafts Z Z' and arms $Z^3$. The rock-shaft P operates the clamping-heads, and the expelling-arms are operated from the main shaft. The label is held to the reciprocating table by the spring-arms, and fed in such intermittent intervals as to allow the roll 10 to insure its catch, grip, and application to the article.

When the reel and cutting device are employed the operation will be readily understood, and it will also be understood that these devices are interchangeable.

The several devices operate automatically, and are timed by this construction in such a manner as to register perfectly with the successive revolutions of the main shaft.

The segmental feeding-surface of the feeding-roll may be made separate from the cylinder and be adjustable, so as to accommodate different widths of goods.

Having thus fully described my invention, what I claim, and desire to secure by Letters Patent of the United States, is—

1. In a can-labeling machine, the gum-applying rolls and a labeling-roll provided with means, substantially as described, for automatically throwing the can from the said gumming to the said labeling rolls, all combined and operated by a common power, as specified.

2. In a can-labeling machine, a clamping-head over the gumming-rolls, adapted to recede automatically to allow an automatically-acting arm to throw the article being labeled to the labeling-roll, combined with said arm, and arranged and adapted to serve as and for the purposes specified.

3. In a can-labeling machine, a revolving head connected to the main shaft by a train of gears, and a clamping-head combined with gum-feeding and gum-applying rolls, and with means, substantially as described for receding said clamps to liberate the can, as specified.

4. In a can-labeling machine, a clamping-head and gum-applying rolls, combined with gear-connections with the main shaft, means, substantially as described, for automatically carrying the gummed article to the labeling-roll, and means, substantially as described, for releasing the article from said labeling-roll, as specified.

5. In a can-labeling machine, the carrying and gumming devices, substantially as described, combined with holding and revolving means, as shown, means, substantially as described, for applying the label, and with means, substantially as described, for simultaneously releasing the cans from both gumming and labeling rolls, as specified.

6. In a can-labeling machine, an inclined feeding-table, a carrier, and means, substantially as described, for gumming, for clamping, and revolving the article while being gummed, for throwing the article to the labeling-roll, for applying the label, and for ejecting the labeled article, the whole combined and operating automatically, as and for the purposes set forth.

7. In a labeling-machine, a label-carrying reciprocating table and means, substantially as described, for holding the label thereon, combined with means, substantially as described, for feeding, gumming, and carrying the article and for applying the label, all working automatically, for the purpose specified.

8. The feed-roll 22, having roughened surface and segmental recess 22', and being provided with circumferential grooves 23, combined with frame 24 24', friction-roll $21^3$, and reciprocating table, as specified.

9. In a can-labeling machine, the frame A, combined with the adjustable portion A*, having slotted arms 60, and secured to said frame A at any desired position, and adjusting set-screws 61, to accommodate different-sized cans by set-screws 61, as set forth.

10. The disk G, rod I, and lever $h'$, combined with the block M, having lug $m$, the shaft M', having arms $m^2$, and spring $l^6$, as and for the purposes set forth.

11. The reciprocating rod I, carrying blocks K M N, combined with the rock-shafts B M' L, provided with arms, as and for the purposes set forth.

12. The shaft D, having annular groove $d^7$ and screw-thread $d^{10}$, combined with the frame A, pivoted arm $d^8$, and roller C', whereby the said roller may be readily removed at will, as specified.

13. The cap or disk G, having lug $o$, combined with the rock-shaft P, arm $p$, clamping-heads U U', and springs W W, as set forth.

14. The disk G, having lug $o$, combined with the rock-shaft P, having arm $p$, clamping-heads U U', springs W W, heads $e f$, and shaft L, having arm $l^3$ $l^4$, as and for the purpose set forth.

15. The shafts Z Z', having the arms $z^3$ $z^4$ pivoted together, the arms $Z^3$, having friction-rolls $z^5$, the spring $z^8$, and operating means, all combined and adapted to operate as set forth.

16. The rock-shaft P, having arm 1, the link 3, arm 4, and frame 5, combined with the roller 10, and adapted to serve as set forth.

17. The rock-shaft P, arm 1, link 3, arm 4, and frame 5, having sockets $10^2$, combined with roller 10, spring 10', bar 9, and slotted arms 7, as and for the purposes set forth.

18. In a can-labeling machine, the combination of the gear 12, having a cam, 12', with a lever, 14, having a pin, the arm 16, shaft 17, and arms 18, for holding the can to the gumming-rolls, and with said gumming-rolls, the whole operating automatically, as specified.

19. The rock-shaft 32, having arm 34, and spring-arms 36, combined with the incline 35, slotted arm 26, arm 27, shaft 28, and arm 29, and with the reciprocating table 31, as and for the purpose specified.

20. The spring-wire frame 38 and roller $21^3$, combined with frame 21, springs 21², and lock-lever 39, for the purpose set forth.

21. The combination of the clamp U U', springs W W, and revolving heads $e\ f$, with means, substantially as described, for automatically retreating said clamps U U' when it is desired to release the can, as set forth.

22. In a can-labeling machine, the oscillating shafts L M', each provided with a spring-pawl adapted to engage the lugs upon the adjustable blocks in one direction, and allowing said lugs to pass idly back in the other direction, as specified.

23. The clamp-heads $f$ U' and their operating mechanism, substantially as described, combined with the shafts Z Z', arms Z³, and rollers $z^5$, as specified.

In testimony whereof I affix my signature in presence of two witnesses.

JAMES C. RICHARDSON.

Witnesses:
H. CLAY SMITH,
J. C. SEBRING.